Figure 1:
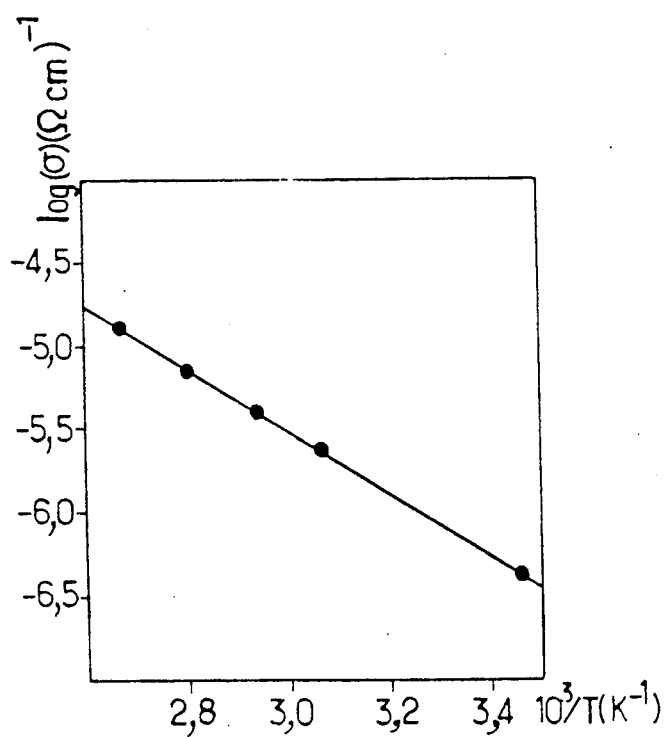

United States Patent [19]
Duclot et al.

[11] Patent Number: 5,006,430
[45] Date of Patent: Apr. 9, 1991

[54] ELECTROCHEMICAL GENERATORS COMPRISING A POSITIVE ELECTRODE AND AN ELECTROLYTE BASED ON VITREOUS MATERIALS

[75] Inventors: Michel J. Duclot, Theys; Thierry Pagnier, Grenoble, both of France

[73] Assignee: Centre National De La Recherche Scientifique, Paris, France

[21] Appl. No.: 691,188

[22] PCT Filed: Apr. 13, 1984

[86] PCT No.: PCT/FR84/00105
§ 371 Date: Dec. 10, 1984
§ 102(e) Date: Dec. 10, 1984

[87] PCT Pub. No.: WO84/04206
PCT Pub. Date: Oct. 25, 1984

[30] Foreign Application Priority Data
Apr. 15, 1983 [FR] France .................... 83 06237

[51] Int. Cl.$^5$ .............................................. H01M 6/18
[52] U.S. Cl. .................... 429/191; 429/193; 429/218
[58] Field of Search .................... 429/191, 193, 218

[56] References Cited

U.S. PATENT DOCUMENTS

| | | | |
|---|---|---|---|
| 4,310,609 | 1/1982 | Liang et al. | 429/218 X |
| 4,331,750 | 5/1982 | Malugani | 429/193 |
| 4,376,709 | 3/1983 | Johnson et al. | 429/218 X |
| 4,478,920 | 10/1984 | Gaband et al. | 429/191 |
| 4,513,070 | 4/1985 | Carette et al. | 429/191 X |

Primary Examiner—Stephen J. Kalafut
Attorney, Agent, or Firm—Larson and Taylor

[57] ABSTRACT

Electro-chemical materials wherein the materials of the positive electrodes and the electrolytes contain vitreous materials comprising respectively a common forming system.

16 Claims, 3 Drawing Sheets

ELECTROCHEMICAL GENERATORS COMPRISING A POSITIVE ELECTRODE AND AN ELECTROLYTE BASED ON VITREOUS MATERIALS

The invention relates to electrochemical generators comprising a positive electrode and an electrolyte based on vitreous materials.

The employment of glasses as electrode materials has already been studied. However the systems proposed, with molten salts as electrolytes, operate at high temperature and have not been subject of industrial applications.

The work carried out by the inventors on this type of material has led them to observe that by associating them with certain vitreous electrolytes and not molten salts, it was possible to develop electrochemical chains of high performance operating at a temperature of the order of ambient and easy to employ enabling them to be realized by the conventional techniques of electonics.

It is therefore an object of the invention to provide electrochemical generators of high energy density containing as positive electrodes materials resulting from the insertion of elements into a vitreous basic system or corresponding glasses not including inserted elements and as electrolytes vitreous materials ensuring the transport of the element to be inserted.

It is aimed also at providing novel vitreous materials useful in particular for developing positive electrodes.

The electrochemical generators of the invention are characterized in that they comprise:

a positive electrode based on vitreous material of the general formula I $$A_x(1-y) F_a X_b y M_c X_d \quad (I)$$

in which:

$F_a X_b$ represents a network-forming system and $M_c X_d$ a so called active system, that is to say capable of capturing or providing electrons, in which:

F is an element selected from among Si, Ge, B, P, Al, Nb, As or Sb;

M represents a transition metal which can exist in several degrees of oxidation from 0 to +7 and existing in the vitreous material of the positive electrode in two of the degrees of oxidation which it may present;

X represents oxygen, sulfur or selenium;

a, b, c and d are indices corresponding to the stoichiometry of the elements in the forming system or in the active system concerned;

Y is a number comprised between 0 and 1 (these two values being excluded);

A represents a monovalent element;

x is nil or represents a number which is not nil whose value depends on a number of electrons and/or electronic sites available in the materials;

a negative electrode based on a material selected from the group comprising the element A or a material capable of releasing it;

an electrolyte formed from a vitreous material, capable of transporting $A^+$ ions and possessing a common former with the vitreous material of the positive electrode.

Advantageously, the use of vitreous materials to form the positive electrode and the electrolyte enables the problems encountered customarily at the interface, resulting in particular, in grain joints with crystalisable materials, to be avoided.

In addition, the use of the same forming system in the electrolyte and the material of the positive electrode enables a delocalization to be obtained of the electolyte-electrode interface due to the continuity of the macromolecular chains of the former from the electrolyte to the electrode.

According also to another advantage of the invention, the generators defined above can be produced in the form of thin layers.

The electrochemical chain can be produced, for example, by evaporation in vacuum of one, two, or three constituents.

The elements A in the positive electrode materials are inserted into the vitreous compounds of formula II  of which the semiconducting properties are already known. These vitreous compounds constitute therefore a matrix for the elements A.

According to an aspect of great interest, it proves that such vitreous compounds constitute, in particular, accepting structures for elements currently used for the fabrication of electrochemical generator electrodes, such as alkali metals, more especially Na or Li, or a metal such as Ag.

Preferably, the transition metal M of the positive electrode material is selected from the group comprising V, Fe, Co, Ni, Mo, W, Ti, Cr or Mn.

According to a preferred embodiment of the invention, the vitreous materials used in the generators are constituted by oxides.

The common forming system of the positive electrode material and of the electrolyte is advantageously selected from among silicon, phosphorus, boron or germanium oxides.

The electrode materials can include several forming systems of the $F_a X_b$ type.

Particularly advantageous systems comprise $P_2O_5$-$B_2O_3$, $P_2O_5$-$SiO_2$-$GeO_2$ and $P_2O_5$-$SiO_2$-$GeO_2$-$B_2O_3$.

Other vitreous oxides comprise a single forming system like $SiO_2$, $GeO_2$, $B_2O_3$, or $P_2O_5$.

Preferred systems comprise $P_2O_5$, $GeO_2$ or $SiO_2$.

The various types of vitreous oxides of the invention enable the construction of generators of high electromotive forces.

According to an aspect whose interest will also be appreciated, these materials can be manufactured in air.

In another preferred embodiment of the invention, the vitreous materials of the electrochemical generators are based on sulfides.

These materials contain advantageously a common forming system selected from among phosphorus, silicon or germanium sulfides.

The preferred sulfides contain several forming systems selected particularly from among $P_2S_5$-$GeS_2$, $P_2S_5$-$SiS_2$ and $P_2S_5$-$GeS_2$-$SiS_2$.

Other preferred sulfides contain a single forming system selected advantageously, for example, from among $P_2S_5$ or $GeS_2$.

The selenides constitute another preferred group of vitreous materials of the invention.

These selinides can contain also several forming systems such as $GeSe_2$-$As_2Se_3$.

In other materials, a single forming system is present and selected advantageously from among $GeSe_2$ or $As_2Se_3$.

The above sulfides and selenides present the advantage of high conductivity and this, more especially for the selenides.

According to an additional feature of the invention in order to improve, in particular, the electronic conductivity of the vitreous materials of formula I, the latter can contain in addition one or several additives of the type $E_eX_f$ in which E represents an alkali metal, an alkali earth or a transition metal, X has one of the meanings given for X in the formula I, these meanings of X being identical for a given material, e and f being the indices corresponding to the stoichiometry of the elements in the additive concerned.

The suitable additives of the oxide type comprise $Ag_2O$, $Li_2O$, $Fe_3O_4$, $B_2O_3$, $SiO_2$, $CaO$, $MoO_3$.

The use of an oxide of an alkali metal favors the diffusion of the alkali cation when the latter is already present in the former of the electrode material.

The negative electrode is formed principally from the metal which must penetrate into the vitreous structure.

It is advantageously a monovalent metal in pure or alloy form.

There is used, in particular, an electrode of alkali metal.

This metal is then more especially constituted by Na or again Li.

Another preferred monovalent metal is constituted by Ag.

In a preferred embodiment of the invention, the electrolyte which comprises a vitreous material containing a common forming system with that of the material of the electrode is selected advantageously from among the material described in the patent application FR No. 82 02083 of Feb. 9, 1982 filed in the name of CENTRE NATIONAL DE LA RECHERCHE SCIENTIFIQUE (CNRS).

Such vitreous electrolytes are constituted by a material comprising a network forming system and a modifier system, doped by at least two salts, these salts comprising the same cation, namely the cation corresponding to that of the modifier compound and anions different from one another.

Generally, in these vitreous electrolytes, apart from the forming system which will hence be identical with that of the electrode materials of the invention, the network modifier system comprises a compound of the type $N_mX_n$ in which N is selected from Li, Na, K, Ag and X from among O, S or Se, the indices m and n corresponding to the stoichiometry of the constituents in a given compound. As to the doping elements, they are constituted by at least two salts of the type $N_q Y_p$. The meaning of N in the group NY is identical, for each salt, with that of N in the group NX. The element Y has in each of the salts different meanings selected from among I, Br, Cl, F, $ClO_4$, $CF_3SO_3$, SCN and $SO_4$. The indices p and q correspond to the stoichiometry of the constituents in a given group NY.

It is understood that the elements X are identical in the positive electrode materials and in the electrolyte for a given chain.

The electrode potentials measured with generators of this type are often higher than those obtained with corresponding crystalline compounds.

This interest is further increased by reason of the easy construction of these generators.

The vitreous materials of formula I in which M represents Ag and x a number not nil, as well as those in which X represents sulfur or selenium and x a number not nil are novel materials and in this respect enter within the scope of the invention.

These vitreous materials are advantageously obtained by insertion chemically by reacting the element A concerned, or a compound capable of releasing this element, for example a halogenide or an organometallic derivative (particularly n-butyl lithium for the liberation of Li) with a vitreous matrix of the type $(1-y) F_aX_b yM_cX_d$, comprising optionally one or several additives of the above-defined type $E_eX_f$. The temperature of the reaction must not exceed a limit corresponding to the recrystallization temperature of the vitreous material. Generally, the operation is performed at ambient temperature.

This reaction is carried out, as the case may be, in the presence of an inorganic solvent of the acetonitrile or tetrahydrofuran type.

According to another modification, the intercalary compounds are manufactured electrochemically.

An electrochemical generator is then advantageously used whose positive electrode comprises a vitreous material of formula II and the negative electrode is based on the element A which it is desired to insert or a material, particularly an alloy, which can release A.

The electrolyte is selected from among materials not corrosive with respect to those constituting the electrodes capable of transporting to the positive electrode the $A^+$ ions and possessing a domain of redox stability compatible with the voltage of the generator obtained. The insertion is then effected by subjecting the electrochemical chain thus constituted to a discharge state. This state is controlled so as to introduce the desired amount of A elements in the vitreous matrix.

The materials constituting this vitreous matrix are advantageously obtained by conventional methods by the reaction of derivatives capable of providing oxides, sulfides or selenides constituting the forming systems or the active systems.

Advantageously, these various routes for reducing vitreous materials of the invention are easy to put into practice.

For the constitution of the electrodes of the invention, the materials can be used in massive form or again in powder with a mixture of electronic conductor and of ionic conductor.

The generators so constituted can operate within a wider range of temperatures of the order of $-55°$ C. to $+300°$ C. according to the vitreous transition temperature of the materials used.

Advantageously, these generators are used at temperatures of the order of 20° to 80° C., in particular at ambient temperature.

They are useful in numerous applications, in particular in microelectronics, particularly in watches, calculators, microprocessors, memories and in any electrochemical device for uses of low and average power.

Other characteristics and advantages of the invention will appear in the examples which follow illustrating embodiments of the invention and in which reference is made to FIGS. 1 to 4 in which there are respectively shown the curve of the variation of the logarithm of the conductivity in $\Omega^{-1}cm^{-1}$ as a function of $10^3 T^{-1}$. T representing the absolute temperature expressed in degrees Kelvin, the variation of the current density $A/cm^2$ as a function of the potential in volts for a given system, the variation of the potential of a material of the invention as a function of the amount of element A inserted, and a 2000 times enlargement photo of a half-chain comprising a positive electrode and the electrolyte.

EXAMPLE 1

Preparation of the Vitreous Material $0.6V_2O_5$-$0.4P_2O_5$

Powder of $V_2O_5$ and $P_2O_5$ are mixed, in the desired proportions to obtain the above molar fractions, in a dry atmosphere to avoid hydration of $P_2O_5$.

Then the mixture is melted at 1000° C., in a stainless steel crucible (type NS 30) heated by the Joule effect. The speed of rise of temperature is high, of the order of 100° C./min, in order to limit the release of $P_2O_5$ before reaction with $V_2O_5$.

The molten mixture is matured for about 1/4 h by slow stirring still at 1000° C.

Then the glass is poured into a mold heated previously to a temperature of 300° C.

Annealing is carried out for 5 to 6 h at 300° C. to remove internal tensions.

This process enables cylindrical specimens to be obtained 3 cm long and 13 mm in diameter.

The glass obtained is deep green very hygroscopic and dissolves easily in hot water. No line appears on analysis by X-ray spectography.

The vitreous nature of the phase obtained is confirmed by differential thermal analysis.

A vitreous transition is observed at 300° C.

The results of the chemical analysis relating to the cations, in mole % of phosphovanadate glass are as follows : V/total:62, P/total:38, $V^{5+}$/V total:0.75.

The content of V and of P is determined by emission spectrometry in plasma, that of V (V) is measured by reduction by $Fe^{2+}$ after dissolving in dilute sulfuric acid.

EXAMPLE 2

Electrical Characterization and Study of the Insertion of Alkali Elements With the Glass $0.6 V_2O_5$-$0.4 P_2O_5$

Electrical Characterization

The following results relate to measurements carried out on specimens of 2 mm thickness cut off from the above cylindrical rods. The contacts are formed by cathodic sputtering of gold in an argon atmosphere.

The variation of conductivity as a function of temperature follows a law $\sigma = \sigma_o \exp(-E\sigma/kT)$ or $\sigma_o = 1.2$ $)1.2^1cm)^1$ and $E\sigma = 0.37$ cV. In FIG. 1 is plotted log $\sigma$ as a function of $10^3 T^1$ for the glass concerned.

The conductivity at ambient temperature is $2 \times 10^{-6}$ $\Omega^{-1}cm^{-1}$.

The potential of the vitreous electrode material with respect to the alkali metal is measured on cells of the alkali metal/conductive solid electrolyte type per alkali/glass ion.

The open circuit voltage is 3.4 V for sodium and 3.6 V for lithium.

With respect to crystallised vanadium oxides, these values are higher by at least 200 to 500 mV.

Chemical Intercalation

The glass is crushed, then placed in suspension in a chemically inert solvent and treated with an excess of reducing alkali salt. To intercalate sodium ions, Na I dissolved in acetonitrile is used and to intercalate Li, a solution of LiBr in tetrahydrofuran.

After the reaction, for a week, at ambient temperature, the glass is separated from the solvent by filtration, rinced with the same pure solvent and dried under vacuum.

All these operations are carried out in an inert purified argon atmosphere whose content of water and of oxygen is less than 1 pm.

The NaI and LiBr salts are dried under vacuum at 200° C. before use.

The solvents are preserved on a molecular sieve (dried THF and ACH for spectroscopy marketed by MERCK).

The intercalation reaction is observed in some minutes by coloration of the solvent by the halogenated compounds and by change in colour of the glass from green to black.

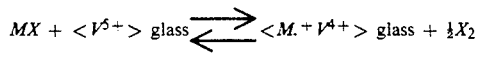

M representing Na or Li, X, I or Br and the symbol $<>$ the solid phase.

The product obtained after reaction is amorphous to X rays. Its composition in % of phosphovanadate determined by chemical analysis is as follows:

V/total=54; P/total=33, $V^{5+}$/V total=0.55 Na=13 and Fe=0.050.

These results show that the number of intercalated alkali ions is close to the number of reduced vanadium atoms.

The ratio of the number of sodium atoms at the number of $V^{5+}$ reduced is in fact 1.1. The molar ratios of alkali metals/vanadium are similar for lithium and sodium. Na/V=0.25 and Li/V=0.20 whilst the use of the most reducing reagent gives the highest intercalary ratio.

EXAMPLE 3

Insertion of Silver into Vitreous Materials Based on Phosphovanadates Used as Positive Electrode Materials in Electrochemical Generators Below are reported the voltages and the current densities obtained with the three following electrochemical chains:

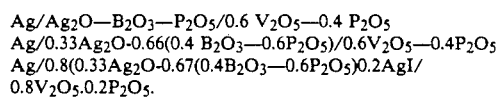

With the two first chains the voltage is of the order of 350 mV and current densities of the order of $10^{-4} A/cm^2$ at ambient temperature. The voltage obtained by means of the third chain is in the vicinity of 150 mV and the current density of the order of $10^{-3} A/cm^2$ again at ambient temperature.

Figure 2:
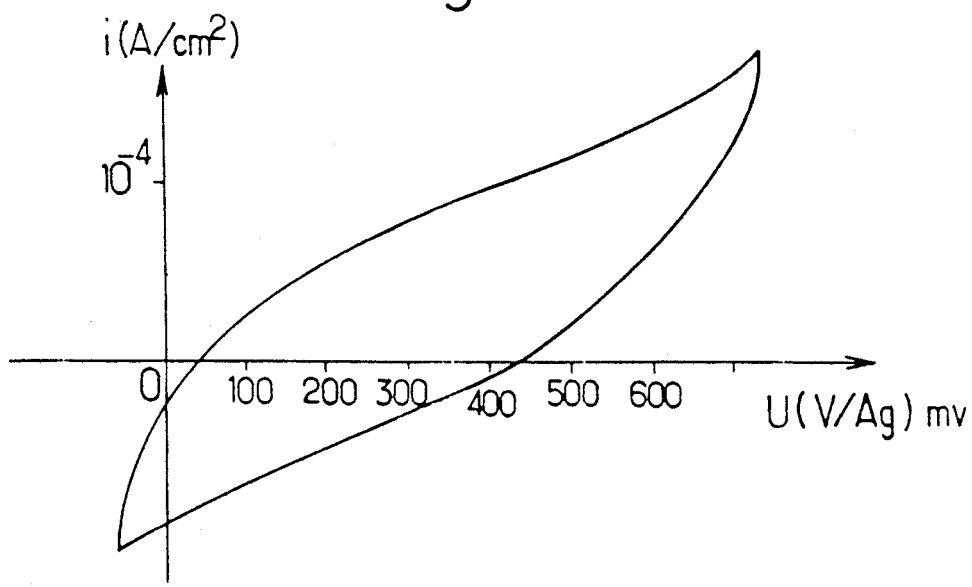

In FIG. 2, is reported the variation of the current density in $A/cm^2$ as a function of the potential in mV (with respect to silver). Examination of this curve shows remarkable reversibility of operation of the vitreous material of the invention.

Figure 3:
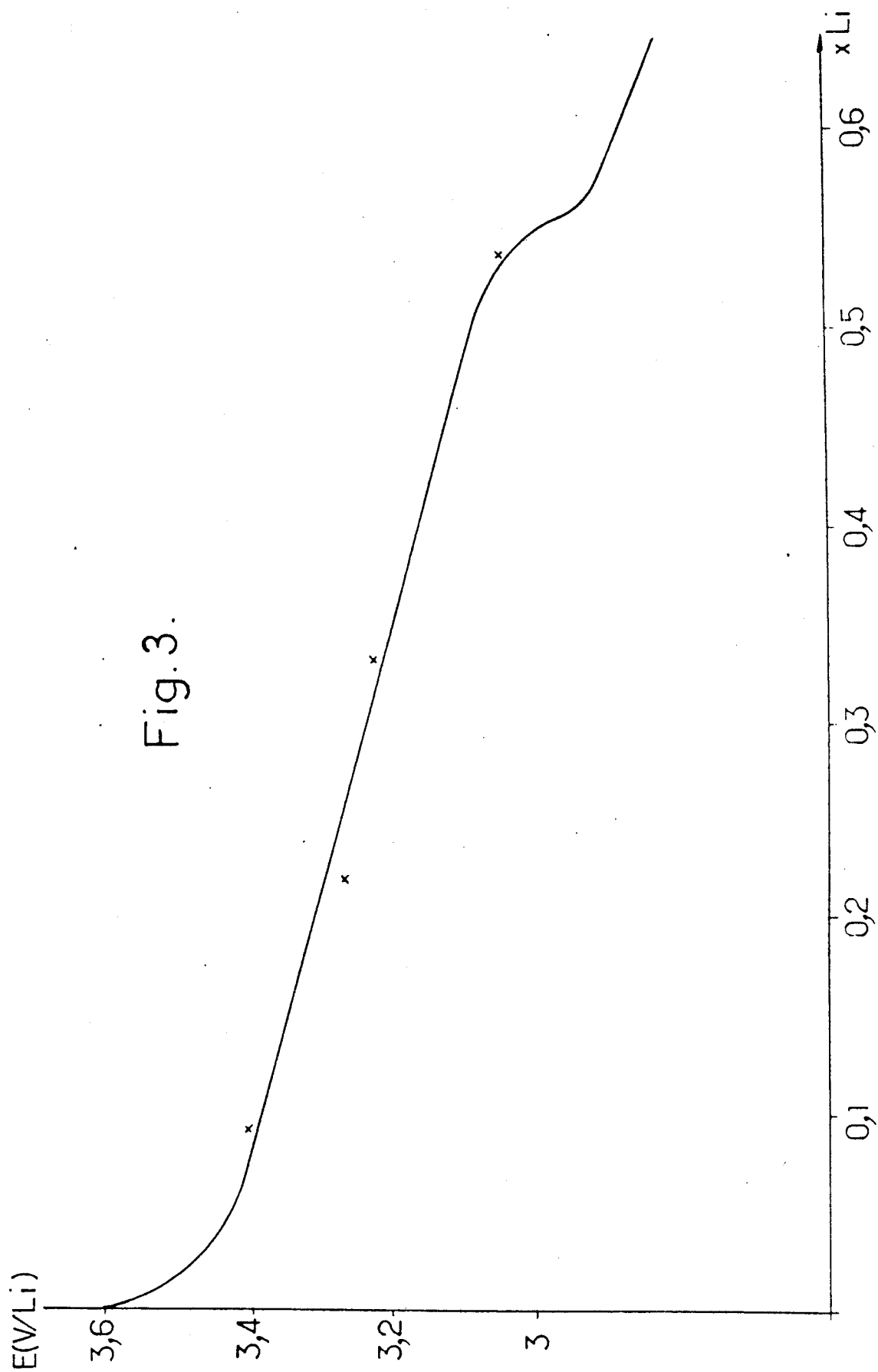

In FIG. 3 is shown the curve of the potential at equilibrium of the system Li (polyoxyethylene)$_8$ Li-$ClO_4$/$0.6V_2O_5$-$0.4P_2O_5$ as a function of the number of Li atoms inserted. The potentials obtained are higher than 3v.

EXAMPLE 4

Use of Vitreous Sulfide in Electrochemical Chains With Lithium

By operating according to conventional techniques a chain Li/0.35 $GeS_2$-0.15 $Li_2S$-0.5 Li I/0.8$VS_2$0.2 $P_2S_5$ is constituted.

The voltage obtained is about 2.7 V with respect to the lithium at 20° C.

The group of results which precede show the advantages of the above vitreous materials as positive electrode materials. Their vitreous structure enables easy synthesis and application, in particular, in the form of powders of the dimensions of the order of a micron. It will be noted moreover that, due to their isotropic structure, these materials offer an electrochemically active surface larger than those of crystalline structures.

Advantageously, it is established, in addition, that the vitreous material with ionic conduction show good conductivities suggesting a high diffusion coefficient of the ion moving in the structure (about $10^{-9}$ to $10^{-8}$ $cm^2/s$).

These materials have also the advantage, taking into account their low density, of offering a large number of available sites for the insertion of element A. Their use as positive electrode material in solid secondary generators does permit good contacts to be ensured in charging and discharging cycles.

Figure 4:
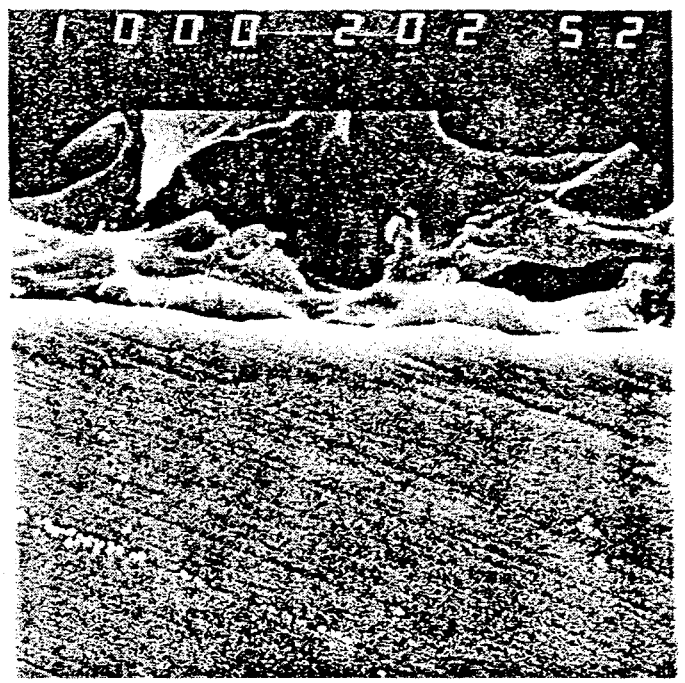

In FIG. 4 is shown a photo with enlargement 2000 corresponding to a half chain 0 8 (0 33 $Ag_2O$-0 67 (0 4$B_2O_3$-0 6 $P_2O_5$) 0 2 Ag I/0 8$V_2O_5$-0 2 $P_2O_5$. This photo, on which a corresponds to the positive electrode and b to the electrolyte, shows the absence of discontinuity between the two materials, which proves the quality of the contact established.

By insertion of lithium into positive electrodes formed from phosphovanadates, phosphotungstates or phosphomolybdates the following chains are produced:

Li/0.33 $Li_2O$—0.33 $P_2O_5$—0.34 LiI/0.6$V_2O_5$—0.4$P_2O_5$
Li/0.33 $Li_2O$—0.33 $P_2O_5$—0.34 LiI/0.4$WO_3$—0.6$P_2O_5$
Li/0.33 $Li_2O$—0.33 $P_2O_5$—0.34 LiI/0.6$MoO_2$—0.4$P_2O_5$
Li/0.6 (0.3 $Li_2O$—0.7 $P_2O_5$) 0.2 LiCl 0.3 LiBr/0.6 $V_2O_5$—0.4$P_2O_5$.

We claim:

1. Electrochemical generators, characterized in that they comprise
   a positive electrode based on a vitreous material of general formula I $$A_x(1-y) \ F_aX_b \ y \ M_cX_c \quad (I)$$

in which:
$F_aX_b$ represents a network forming system and
$M_cX_d$ a so-called active system, that is to say capable of capturing or providing electrons, in which:
F is an element selected from among Si, Ge, B, P, Al, Nb, As or Sb;
M represents a transition metal which can exist in several degrees of oxidation from 0 to +7 and existing in the vitreous material of the positive electrode in at least two of the degrees of oxidation that it may present;
X represents oxygen, sulfur or selenium;
a, b, c and d are indices corresponding to the stoichiometry of the elements in the forming system or in the active system concerned;
y is a number comprised between 0 and 1 (these two values being excluded);
A represents a monovalent element;
x is nil or represents a number not nil of which the value depends on the number of electrons and/or electron sites available in the materials;
a negative electrode based on a material selected from the group comprising the element A or a material capable of separating it,
an electrolyte formed from a vitreous material, which can transport the $A^+$ ions and possessing a former common with the vitreous material of the positive electrode.

2. Generators according to claim 1, characterized in that M is selected from the group comprising V, Fe, Co, Ni, Mo, W, Ti, Cr or Mn.

3. Generators according to claim 1, characterized in that A represents an element selected from among an alkali metal or silver.

4. Generators according to claim 3, characterized in that A represents Na or Li.

5. Generators according to claim 1, characterized in that X represents oxygen.

6. Generators according to claim 5, characterized in that the vitreous materials of the positive electrode and of the electrolyte contain one or several common forming oxides selected from the group comprising oxides of silicon, boron, phosphorus and germanium.

7. Generators according to claim 5, characterized in that the vitreous materials of the positive electrode and of the electrolyte contain a common forming system selected from the group comprising: $P_2O_5$-$B_2O_3$; $P_2O_5$-$SiO_2$-$GeO_2$; $P_2O_5$-$SiO_2$-$GeO_2$-$B_2O_3$; $SiO_2$; $GeO_2$; $B_2O_3$; $P_2O_5$ or $SiO_2$-$B_2O_3$.

8. Generators according to claim 1, characterized in that X represents sulfur.

9. Generators according to claim 8, characterized in that the vitreous materials of the positive electrode and of the electrolyte contain one or several common sulfides selected from the group comprising sulfides of phosphorous, silicon and germanium.

10. Generators according to claim 8, characterized in that the vitreous materials of the positive electrode and of the electrolyte contain a common forming system selected from the group comprising: $P_2S_5$, $GeS_2$, $P_2S_5$-$GeS_2$, $P_2S_5$-$SiS_2$ or $P_2S_5$-$GeS_2SiS_2$.

11. Generators according to claim 1, characterized in that X represents selenium.

12. Generators according to claim 11, characterized in that the forming system of the vitreous material of the electrolyte and of the positive electrode is constituted by $GeSe_2$, $As_2Se_3$ or their mixture.

13. Generators according to claim 1, characterized in that the materials of the positive electrode comprise, in addition, one or several additives of the type $E_cX_f$ in which E represents an alkali, an alkaline earth metal or a transition metal, X has one of the meanings given for X in the formula I, these meanings being identical for a given material e and f being indices corresponding to the stoichiometry of the elements in the additive concerned.

14. Generators according to claim 1, characterized in that the electrolyte comprises a vitreous material containing a network forming system and a network modifying system, doped by at least two salts comprising the same cation as that of the modifying system.

15. Generators according to claim 14, characterized in that the network modifying system comprises a compound of the type $N_mX_n$ in which N is selected from among Li, Na, K, Ag and X from among O, S or Se, the indices m and n corresponding to the stoichiometry of the constituents in a given compound and that the doping elements are constituted by at least two salts of the formula $N_qY_p$ in which N in the group NX is identical, for each salt, with that of N in the group NX, the element Y presents in each of the salts different meanings selected from among I, Br, Cl, F, $ClO_4$, $CF_3SO_3$, SCN and $SO_4$, the indices m, p and q correspond to the stoichiometry of the constituents in a given group NY.

16. Generators according to claim 1, characterized in that they comprise a chain selected from among:

Li/0.33 $Li_2O$—0.33 $P_2O_5$—0.34 LiI/0.6$V_2O_5$—0.4$P_2O_5$
Li/0.33 $Li_2O$—0.33 $P_2O_5$—0.34 LiI/O 4$WO_3$—0.6$P_2O_5$
Li/0.33 $Li_2O$—0.33 $P_2O_5$—0.34 LiI/0.6$MoO_3$—0.4$P_2O_5$
Li/0.6 (0.3 $Li_2O$—0.7 $P_2O_5$) 0.2 LiCl 0.2 LiBr/0.6 $V_2O_5$—0.4$P_2O_5$.
Ag/$Ag_2O$—$B_2O_3$—$P_2O_5$/0.6 $V_2O_5$—0.4 $P_2O_5$
Ag/0.33$Ag_2O$-0.66 (0.4 $B_2O_3$—0.6$P_2O_5$)/0.6$_2O_5$—0.4$P_2O_5$
Ag/0.8(0.33$Ag_2O$-0.66(0.4$B_2O_3$—0.6$P_2O_5$)0.2AgI/ 0.8$V_2O_5$—0.2 $P_2O_5$ or
Li/0.35 $GeS_20.15$ $Li_2S$—$P_2S_5$—0.5 Li I/0 8$VS_20.2P_2S_5$.

* * * * *